United States Patent [19]

Gruber et al.

[11] 4,378,457
[45] Mar. 29, 1983

[54] CYANACRYLIC ACID ESTER BASED GLUES WITH A CONTENT OF A DIESTER OF A POLYOXYALKYLENE GLYCOL

[75] Inventors: Werner Gruber, Korschenbroich; Hans-Athanas Bruhn, Garbsen, both of Fed. Rep. of Germany

[73] Assignee: Henkel Kommanditgesellschaft Auf Aktien, Düsseldorf-Holthausen, Fed. Rep. of Germany

[21] Appl. No.: 328,993

[22] Filed: Dec. 9, 1981

[30] Foreign Application Priority Data

May 27, 1981 [DE] Fed. Rep. of Germany ....... 3121119

[51] Int. Cl.³ .................... C08F 38/00; C08F 36/02
[52] U.S. Cl. .................... 526/285; 428/521; 428/522; 525/202; 525/217; 525/226; 525/233; 526/295; 526/298; 528/271; 528/361; 528/362
[58] Field of Search .................... 526/285, 295, 298

[56] References Cited

U.S. PATENT DOCUMENTS 3,082,242  3/1963  Miller et al. .................... 526/285
3,933,754  1/1976  Kitagawa et al. .................... 526/295

FOREIGN PATENT DOCUMENTS 2487842  2/1982  France .................... 526/285

*Primary Examiner*—Harold D. Anderson

*Attorney, Agent, or Firm*—Hammond & Littell, Weissenberger and Muserlian

[57] ABSTRACT

Cyanacrylic acid ester based glues with a reduced setting time comprising a cyanacrylic acid ester and from 0.005% to 3% by weight, based on the cyanacrylic acid ester of a polyoxyalkylene glycol diester having the formula

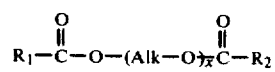

wherein x is an integer from 5 to 80, Alk is an alkylene having from 2 to 4 carbon atoms, and $R_1$ and $R_2$ represent members selected from the group consisting of hydroxyl, halogen, lower alkoxy, alkoxyalkyl having from 3 to 12 carbon atoms, alkyl having from 1 to 12 carbon atoms, cyanoalkyl having from 1 to 12 carbon atoms, haloalkyl having from 1 to 12 carbon atoms, nitroalkyl having from 1 to 12 carbon atoms, alkenyl having from 2 to 12 carbon atoms, alkynyl having from 2 to 12 carbon atoms, cycloalkyl having from 3 to 12 carbon atoms, phenyl, nitrophenyl, halophenyl, phenylalkyl having from 1 to 6 carbon atoms in the alkyl and alkylphenyl having from 1 to 6 carbon atoms in the alkyl.

3 Claims, No Drawings

CYANACRYLIC ACID ESTER BASED GLUES WITH A CONTENT OF A DIESTER OF A POLYOXYALKYLENE GLYCOL

BACKGROUND OF THE INVENTION

The present invention concerns glues based on cyanacrylic acid esters with a shortened setting time and their use on porous surfaces.

It is known that glues based on cyanacrylic acid esters are characterized by short setting times during the bonding or cementing of various materials. This hardening is generally due to an anionically released polymerization. While metal surfaces, glass etc. can be bonded very rapidly with each other, difficulties are encountered in the bonding of porous surfaces with these glues. Such difficulties are particularly observed in materials, like wood, paper, leather, etc.

In an α-cyanacrylic acid ester is used to bond materials whose surfaces show an acid reaction, the anionic polymerization is inhibited, and the setting time is extended. The adhesive strength is not satisfactory either. Wood has generally a moisture content of about 10% by weight under normal conditions (22° C. at a relative humidity of 40%). Despite this high water content of the woody tissue and on the surface of the wood materials, a setting time or more than 10 to 20 minutes is required to bond with the known cyanacrylic acid ester based glues. Since the cyanacrylic acid esters penetrate during this time into the woody tissue, it is difficult to bond wood with these cements. Accordingly the effectiveness of these glues as quick setting cements drops drastically.

It is known that these difficulties can be at least partly eliminated by the addition of macrocyclic polyethers, also called crown ethers. When these compounds or certain nonionic tensides based on polyethylene glycols are added, the hardening time of the cyanacrylic acid esters is considerably reduced.

However, the addition of these known compounds can also lead to an undesired destabilization of the cyanacrylic acid esters, so that they have only a limited storage time, which is naturally undesired.

OBJECTS OF THE INVENTION

An object of the present invention was therefore to find additives which, on the one hand, considerably shorten the hardening time of the α-cyanacrylic acid esters, and permit bonding on porous, particularly acid surfaces, but, on the other hand, do not lead to an undesired excessive reduction of the storage time of the gluestuff.

Another object of the present invention is the development of cyanacrylic acid ester based glues with a reduced setting time comprising a cyanacrylic acid ester and from 0.005% to 3% by weight, based on the cyanacrylic acid ester of a polyoxyalkylene glycol diester having the formula

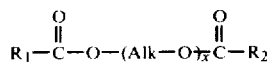

wherein x is an integer from 5 to 80, Alk is an alkylene having from 2 to 4 carbon atoms, and $R_1$ and $R_2$ represent members selected from the group consisting of hydroxyl, halogen, lower alkoxy, alkoxyalkyl having from 3 to 12 carbon atoms, alkyl having from 1 to 12 carbon atoms, cyanoalkyl having from 1 to 12 carbon atoms, haloalkyl having from 1 to 12 carbon atoms, nitroalkyl having from 1 to 12 carbon atoms, alkenyl having from 2 to 12 carbon atoms, alkynyl having from 2 to 12 carbon atoms, cycloalkyl having from 3 to 12 carbon atoms, phenyl, nitrophenyl, halophenyl, phenylalkyl having from 1 to 6 carbon atoms in the alkyl and alkylphenyl having from 1 to 6 carbon atoms in the alkyl.

These and other objects of the invention will become more apparent as the description thereof proceeds.

DESCRIPTION OF THE INVENTION

The drawbacks of the prior art were overcome and the above objects were achieved according to the present invention in that from 0.005% to 3.0% by weight, based on cyanacrylic acid esters, of polyoxyalkylene glycol diesters of the formula

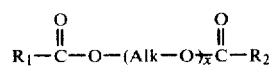

where x denotes a number from 6 to 80, Alk denotes an alkyl radical with 2,3 or 4 carbon atoms, and $R_1$ and $R_2$ represent an alkyl and/or a hydrocarbon aryl and/or a cycloalkyl with 1 to 12 carbon atoms, optionally containing ether groups, nitrile, nitro, or halogen or double bonds or triple bonds, are added to glues based on cyanacrylic acid esters.

More particularly, the present invention relates to cyanacrylic acid ester based glues with a reduced setting time comprising a cyanacrylic acid ester, particularly an ester having from 1 to 12 carbon atoms in the alcohol moiety, and from 0.005% to 3% by weight, based on the cyanacrylic acid ester, of a polyoxyalkylene glycol diester having the formula

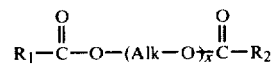

wherein x is an integer from 5 to 80, Alk is an alkylene having from 2 to 4 carbon atoms, and $R_1$ and $R_2$ represent members selected from the group consisting of hydroxyl, halogen, lower alkoxy, alkoxyalkyl having from 3 to 12 carbon atoms, alkyl having from 1 to 12 carbon atoms, cyanoalkyl having from 1 to 12 carbon atoms, haloalkyl having from 1 to 12 carbon atoms, nitroalkyl having from 1 to 12 carbon atoms, alkenyl having from 2 to 12 carbon atoms, alkynyl having from 2 to 12 carbon atoms, cycloalkyl having from 3 to 12 carbon atoms, phenyl, nitrophenyl, halophenyl, phenylalkyl having from 1 to 6 carbon atoms in the alkyl and alkylphenyl having from 1 to 6 carbon atoms in the alkyl.

For the production of the polyoxyalkylene glycol diesters to be added according to the invention, one can start from polyoxyethylene glycols which are composed of 6 to 80 ethylene glycol units. In practice, polyoxyethylene glycols of a molecular weight of about 200 to 5000 are available. These can be acylated in known manner. The same holds true for polyoxypropylene glycols, which are commercial compounds obtainable with molecular weight of 400 to 2000. Preferred are polyoxyethylene glycols with a molecular weight of about 400 to 1000. Polyoxybutylene glycols, as are available from tetrahydrofuran by ring opening polymerization, can likewise be used.

The two terminal OH groups can be acylated according to known methods. An acylation can be effected, e.g. with a propionic acid ester, a butyric acid ester, a cyanacetic acid ester, a chloroformic acid ester, a chloroacetic acid ester, or the corresponding acid chlorides. Furthermore the reaction can be effected with acrylic acid chloride or methacrylic acid chloride or ester. With the acrylic acid compounds or methacrylic acid compounds especially good results are obtained. The polyoxyalkylene glycols, which are esterified by an acrylic acid or methacrylic acid radical, are characterized by especially good adhesive strength. Preferred additives are thus the di(meth)acrylic acid esters of polyoxyethylene glycol, the glycol having a molecular weight of 200 to 1000, in an amount of 0.05% to 3.0% by weight, based on cyanacrylic acid ester.

Suitable as a base for the gluestuffs provided with the additives according to the invention is primarily an α-cyanacrylic acid ester preferably where the alcohol moiety has from 1 to 12 carbon atoms, such as an alkyl group with 1 to 12 carbon atoms, which can be substituted with a substituent, like a halogen or an alkoxy, a linear or branched alkenyl group with 2 to 12 carbon atoms, an alkynyl group with 2 to 12 carbon atoms, a cycloalkyl group with 3 to 12 carbon atoms, a hydrocarbon aralkyl group with 7 to 12 carbon atoms or a hydrocarbon aryl group. Examples of such components are: methyl, ethyl, n-propyl, isopropyl, n-butyl, isobutyl, pentyl, hexyl, allyl, methallyl, crotyl, 2-chloroethyl, 3-chloropropyl, 2-chlorobutyl, trifluoroethyl, 2-methoxyethyl, 3-methoxybutyl and 2-ethoxyethyl.

The α-cyanacrylic acid ester used according to the present invention can consist of a single α-cyanacrylic acid ester or of a mixture of two or more α-cyanacrylic acid esters. The properties of the glues can be favorably influenced by additives, like anionic polymerization inhibitors and/or free radical polymerization inhibitors, thickeners, plasticizers, heat stabilizers, as well as dyes, pigments etc.

A suitable amount of α-cyanacrylic acid ester is about 80% to 99.9% by weight, preferably 90% to 99.9% by weight, based on the total weight of the adhesive composition.

About 1 to 1000 ppm of anionic polymerization inhibitors, based on the total weight of the adhesive composition, can be used to increase the stability of the glues in storage. Examples of anionic polymerization inhibitors are sulfur dioxide, aromatic sulfonic acids, aliphatic sulfonic acids and phosphoric acid partial esters. Suitable inhibitors for free-radical polymerization are, for example, hydroquinone and hydroquinone monomethylether. They can be used in an amount of about 1 to 5000 ppm, based on the total weight of the adhesive composition, to capture any free-radicals formed.

In order to increase the viscosity a thickener can be added. The α-cyanacrylic acid esters having generally a low viscosity of only several mPa.s. The glue therefore penetrates easily into porous materials, like wood and leather, or into materials with a rough surface. It is then difficult to obtain a good adhesion.

Various polymers can be used as thickener such as like poly-(methyl methacrylate), copolymers of methacrylic acid esters, acrylic rubbers, cellulose derivatives, polyvinyl acetate and polymerized α-cyanacrylic acid esters. A suitable amount of thickeners is generally about 20% by weight or less, based on the total weight of the adhesive composition.

The plasticizers, dyes, pigments, etc. can be added, depending on the intended use, in amounts which have no adverse effect on the stability of the α-cyanacrylic acid ester.

The cyanacrylic acid esters provided with the additives according to the invention can be used for bonding porous surfaces with themselves or with other porous surfaces. They are used particularly for bonding wood, paper, leather or textiles. Good bonds can also be obtained on metals, like aluminum or iron.

The following examples are illustrative of the invention without being limitative in any respect.

EXAMPLES

The following compounds were tested:

| | | |
|---|---|---|
| A | dimethacrylic acid ester of polyoxyethylene glycol | (MW 400) |
| B | dimethacrylic acid ester of polyoxyethylene glycol | (MW 600) |
| C | dimethacrylic acid ester of polyoxyethylene glycol | (MW 1000) |
| D | dicarbonic acid ester of polyoxyethylene glycol | (MW 600) |
| E | dicarbonic acid ester of polyoxyethylene glycol | (MW 1000) |
| F | di-α-cyanacetic acid ester of polyoxyethylene glycol | (MW 600) |
| G | di-α-cyanacetic acid ester of polyoxyethylene glycol | (MW 1000) |
| H | di-α-cyanacetic acid ester of polyoxyethylene glycol | (MW 2000) |
| I | di-α-cyanacetic acid ester of polyoxypropylene glycol | (MW 1000) |
| J | dimethacrylic acid ester of polyoxypropylene glycol | (MW 1000) |

The cyanacrylate glue consisted of:

| | |
|---|---|
| Ethyl α-cyanacrylate | 90% |
| poly-(methyl methacrylate) | 10% |

The following Table 1 shows the use of the additives according to the invention in % by weight in dependence on the current number of the example, and gives the time up to the so-called hand strength. The hand strength was determined on birch wood by means of overlapping cementing and end face cementing. It is the time that elapses until the wood pieces with adhesive therebetween can no longer be moved easily by hand relative to each other.

TABLE 1

| Example | Additive Compound | % | Hand strength overlapping cementing | Hand strength end face cementing |
|---|---|---|---|---|
| | | | in seconds | in seconds |
| 1 | A | 0.5 | 30 | 110 |
| 2 | A | 0.1 | 50 | 150 |
| 3 | A | 0.05 | 70 | 180 |
| 4 | B | 1.0 | 25 | 60 |
| 5 | B | 0.5 | 30 | 80 |
| 6 | B | 0.1 | 35 | 100 |
| 7 | C | 1.0 | 20 | 40 |
| 8 | D | 1.0 | 60 | 100 |
| 9 | D | 0.5 | 90 | 150 |
| 10 | E | 1.0 | 50 | 100 |
| 11 | E | 0.5 | 70 | 120 |
| 12 | F | 2.0 | 30 | 50 |
| 13 | F | 0.5 | 40 | 70 |
| 14 | F | 0.1 | 120 | 150 |
| 15 | G | 1.0 | 45 | 75 |
| 16 | G | 0.5 | 90 | 120 |

TABLE 1-continued

| Example | Additive Compound | % | Hand strength overlapping cementing | Hand strength end face cementing |
|---|---|---|---|---|
| 17 | H | 0.5 | 90 | 100 |
| 18 | I | 0.5 | 360 | 400 |
| 19 | J | 0.5 | 45 | 60 |
| 20 | J | 0.1 | 30 | 50 |
|  |  |  | in minutes | in minutes |
| Comparison (no additive) |  |  | 25 | 25 |

Table 2 shows the tensile shearing strength (in overlapping cementing) and the tensile strength (in end face cementing) in dependence on the current number of the example. These were determined on the following test pieces:

1. Test piece for end face cementing = tensile strength 100×20×25 mm dry birchwood, cemented area 500 mm².

2. Test piece for overlapping cementing—tensile shearing strength 100×25×5 mm dry birchwood, overlapping 10 mm, cemented area 250 mm².

5 cementings each were made, and the mean value was determined after 3 and 24 hours of hardening. The test conditions were: The tensile testing machine worked with a draw of 15 mm/min.

The hardening was effected at 22° C./40% relative humidity (air-conditioned room).

TABLE 2

| Example No. | Strength values N/mm² | | | |
|---|---|---|---|---|
|  | Tensile shearing strength | | Tensile strength | |
|  | 3 h | 24 h | 3 h | 24 h |
| 1 | 14 | 17 | 16 | 18 |
| 2 | 12 | 13 | 15 | 16 |
| 3 | 13 | 15 | 17 | 18 |
| 4 | 13 | 13 | 14 | 18 |
| 5 | 14 | 14 | 15 | 19 |
| 6 | 15 | 15 | 12 | 18 |
| 7 | 14 | 15 | 15 | 19 |
| 8 | 12 | 14 | 13 | 16 |
| 9 | 10 | 15 | 12 | 17 |
| 10 | 13 | 15 | 12 | 18 |
| 11 | 11 | 16 | 13 | 17 |
| 12 | 17 | 18 | 7 | 17 |
| 13 | 15 | 17 | 8 | 15 |
| 14 | 12 | 18 | 10 | 18 |
| 15 | 16 | 18 | 6 | 16 |
| 16 | 16 | 16 | 4 | 12 |
| 17 | 14 | 13 | 10 | 15 |
| 18 | 12 | 14 | 9 | 16 |
| 19 | 12 | 18 | 8 | 14 |
| 20 | 10 | 18 | 6 | 15 |
| Comparison | 10 | 18 | 0.7 | 4 |

The preceding specific embodiments as illustrative of the practice of the invention. It is to be understood however, that other expedient known to those skilled in the art or disclosed herein, may be employed with departing from the spirit of the invention or the scope of the appended claims.

I claim:

1. Cyanacrylic acid ester based glues with a reduced setting time comprising an α-cyanacrylic acid ester having from 1 to 12 carbon atoms in the alcohol moiety and from 0.005% to 3% by weight, based on the cyanacrylic acid ester of a polyoxyalkylene glycol diester having the formula

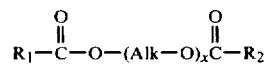

wherein x is an integer from 5 to 80, Alk is an alkylene having from 2 to 4 carbon atoms, and $R_1$ and $R_2$ represent members selected from the group consisting of alkenyl having from 2 to 12 carbon atoms and alkynyl having from 2 to 12 carbon atoms.

2. The cyanacrylic acid ester based glues of claim 1 having a content of from 80% to 99.9% by weight of said α-cyanacrylic acid ester having from 1 to 12 carbon atoms in the alcohol moiety.

3. The cyanacrylic acid ester based glues of claim 1 or 2 wherein said polyoxyalkylene glycol diester is a di(-meth)acrylic acid ester of a polyoxyethylene glycol having a molecular weight of from 200 to 1000, being present in an amount of from 0.05% to 3% by weight, based on the cyanacrylic acid ester.

* * * * *